(12) United States Patent
Yan et al.

(10) Patent No.: US 12,071,233 B2
(45) Date of Patent: Aug. 27, 2024

(54) BATTERY SYSTEMS WITH POWER OPTIMIZED ENERGY SOURCE AND ENERGY STORAGE OPTIMIZED SOURCE

(71) Applicant: Kitty Hawk Corporation, Palo Alto, CA (US)

(72) Inventors: Xu Yan, San Francisco, CA (US); BinBin Chi, Fremont, CA (US); Evan E. Frank, Los Altos Hills, CA (US); Aaron Schultz, San Jose, CA (US)

(73) Assignee: Kitty Hawk Corporation, Palo Alto, CA (US)

( * ) Notice: Subject to any disclaimer, the term of this patent is extended or adjusted under 35 U.S.C. 154(b) by 0 days.

(21) Appl. No.: 18/134,488

(22) Filed: Apr. 13, 2023

(65) Prior Publication Data

US 2023/0382523 A1    Nov. 30, 2023

Related U.S. Application Data

(63) Continuation of application No. 17/824,633, filed on May 25, 2022, now Pat. No. 11,655,024.

(51) Int. Cl.
| | |
|---|---|
| *H02J 7/00* | (2006.01) |
| *B60L 50/60* | (2019.01) |
| *B60L 53/62* | (2019.01) |
| *B64C 29/00* | (2006.01) |
| *H02J 7/34* | (2006.01) |
| *B64U 50/19* | (2023.01) |

(52) U.S. Cl.
CPC .......... *B64C 29/0033* (2013.01); *B60L 50/66* (2019.02); *B60L 53/62* (2019.02); *H02J 7/342* (2020.01); *B60L 2200/10* (2013.01); *B60L 2210/10* (2013.01); *B64U 50/19* (2023.01)

(58) Field of Classification Search
CPC .. B64C 29/0033; B60L 50/66; B60L 2200/10; B60L 2210/10; B60L 53/62; H02J 7/342; B64U 50/19
USPC ......................................... 320/103, 116, 126
See application file for complete search history.

(56) References Cited

U.S. PATENT DOCUMENTS

| | | |
|---|---|---|
| 1,868,832 A | 7/1932 | Henter |
| 2,415,710 A | 2/1947 | Smith |

(Continued)

FOREIGN PATENT DOCUMENTS

| | | |
|---|---|---|
| CN | 1265534 A | 9/2000 |
| CN | 1864329 A | 11/2006 |

(Continued)

OTHER PUBLICATIONS

Author Unknown, Aerial Ridesharing at Scale, Uber Elevate, Oct. 3, 2019, Retrieved from http://web.archive.org/web/20191003070118/https://www.uber.com/us/en/elevate/uberair/.

(Continued)

*Primary Examiner* — Zixuan Zhou
(74) *Attorney, Agent, or Firm* — Van Pelt, Yi & James LLP

(57) ABSTRACT

A system includes a power optimized energy source, an energy storage optimized source, and a network that combines a first current from the power optimized energy source and a second current from the energy storage optimized source in order to power a load at least during a high power demand event, including by connecting the power optimized energy source and the energy storage optimized source using a parallel connection.

16 Claims, 7 Drawing Sheets

(56) References Cited

U.S. PATENT DOCUMENTS

| | | | |
|---|---|---|---|
| 2,937,823 A | 5/1960 | Fletcher |
| 3,081,964 A | 3/1963 | Quenzler |
| 3,089,666 A | 5/1963 | Quenzler |
| 3,115,317 A | 12/1963 | Merrick |
| 3,121,544 A | 2/1964 | Alvarez-Calderon |
| 3,159,361 A | 12/1964 | Weiland |
| 3,179,354 A | 4/1965 | Alvarez-Calderon |
| 3,203,649 A | 8/1965 | Girard |
| 3,273,827 A | 9/1966 | Girard |
| 3,284,027 A | 11/1966 | Mesniere |
| 3,666,209 A | 5/1972 | Taylor |
| 3,949,957 A | 4/1976 | Portier |
| 4,025,860 A | 5/1977 | Shibata |
| 4,080,922 A | 3/1978 | Brubaker |
| 4,613,098 A | 9/1986 | Eickmann |
| 4,746,081 A | 5/1988 | Mazzoni |
| 4,930,725 A | 6/1990 | Thompson |
| 4,979,698 A | 12/1990 | Lederman |
| 5,195,702 A | 3/1993 | Malvestuto, Jr. |
| 5,244,167 A | 9/1993 | Turk |
| 5,454,531 A | 10/1995 | Melkuti |
| 6,561,456 B1 | 5/2003 | Devine |
| 6,732,972 B2 | 5/2004 | Malvestuto, Jr. |
| 7,049,792 B2 | 5/2006 | King |
| 7,399,554 B2 | 7/2008 | Kejha |
| 8,128,019 B2 | 3/2012 | Annati |
| 8,543,270 B2 | 9/2013 | Kelty |
| 8,552,575 B2 | 10/2013 | Teets |
| 9,300,018 B2 | 3/2016 | Watson |
| 9,356,470 B2 | 5/2016 | Yamamoto |
| 9,694,906 B1 | 7/2017 | Sadek |
| 9,957,042 B1 | 5/2018 | Vander Lind |
| 9,975,631 B1 | 5/2018 | Mclaren |
| 10,144,503 B1 | 12/2018 | Vander Lind |
| 10,153,636 B1 | 12/2018 | Vander Lind |
| 10,710,741 B2 | 7/2020 | Mikić et al. |
| D892,710 S | 8/2020 | Vander Lind |
| 10,773,799 B1 | 9/2020 | Thrun |
| 10,778,024 B2 | 9/2020 | Gu |
| 10,843,807 B2 | 11/2020 | Bevirt |
| 10,845,823 B2 | 11/2020 | Burghardt |
| 11,097,839 B2 | 8/2021 | Sinha |
| 11,447,035 B1 * | 9/2022 | Hull ............... B64C 29/0033 |
| 2002/0014880 A1 | 2/2002 | McAndrews |
| 2003/0094537 A1 | 5/2003 | Austen-Brown |
| 2004/0201365 A1 | 10/2004 | Dasgupta |
| 2005/0133662 A1 | 6/2005 | Magre |
| 2006/0118675 A1 | 6/2006 | Tidwell |
| 2006/0144992 A1 | 7/2006 | Jha |
| 2006/0208692 A1 * | 9/2006 | Kejha ............... H01M 16/00 |
| | | | 320/103 |
| 2006/0216585 A1 | 9/2006 | Lee |
| 2010/0051753 A1 | 3/2010 | Yoeli |
| 2010/0117599 A1 * | 5/2010 | Chow ............... H02J 7/0014 |
| | | | 320/134 |
| 2011/0001020 A1 | 1/2011 | Forgac |
| 2011/0155859 A1 | 6/2011 | Vetters |
| 2011/0168835 A1 | 7/2011 | Oliver |
| 2011/0185736 A1 | 8/2011 | Mckinney |
| 2011/0260544 A1 | 10/2011 | Imai |
| 2011/0267241 A1 | 11/2011 | Grimm |
| 2012/0209456 A1 | 8/2012 | Harmon |
| 2012/0235473 A1 | 9/2012 | Jiang |
| 2012/0286102 A1 | 11/2012 | Sinha |
| 2013/0147276 A1 | 6/2013 | Yamamoto |
| 2013/0221154 A1 | 8/2013 | Vander Lind |
| 2014/0011076 A1 | 1/2014 | Kanemoto |
| 2014/0111121 A1 | 4/2014 | Wu |
| 2014/0151495 A1 | 6/2014 | Kuhn, Jr. |
| 2014/0158816 A1 | 6/2014 | Delorean |
| 2014/0186659 A1 | 7/2014 | Dhar |
| 2014/0265554 A1 | 9/2014 | Yang |
| 2015/0028151 A1 | 1/2015 | Bevirt |
| 2015/0136897 A1 | 5/2015 | Seibel |
| 2015/0202984 A1 | 7/2015 | Wyatt |
| 2015/0232178 A1 | 8/2015 | Reiter |
| 2015/0266571 A1 | 9/2015 | Bevirt |
| 2015/0344134 A1 | 12/2015 | Cruz Ayoroa |
| 2015/0354453 A1 | 12/2015 | Hanrahan |
| 2016/0072107 A1 | 3/2016 | Farha |
| 2016/0101853 A1 | 4/2016 | Toppenberg |
| 2016/0214712 A1 | 7/2016 | Fisher |
| 2016/0221683 A1 | 8/2016 | Roberts |
| 2016/0288903 A1 | 10/2016 | Rothhaar |
| 2016/0340035 A1 | 11/2016 | Duru |
| 2016/0380315 A1 | 12/2016 | Weicker |
| 2017/0008627 A1 | 1/2017 | De Soto |
| 2017/0012445 A1 | 1/2017 | Takemura |
| 2017/0036760 A1 | 2/2017 | Stan |
| 2017/0057650 A1 | 3/2017 | Walter-Robinson |
| 2017/0072812 A1 | 3/2017 | Von Novak |
| 2017/0197700 A1 | 7/2017 | Wainfan |
| 2017/0203839 A1 | 7/2017 | Giannini |
| 2017/0203850 A1 | 7/2017 | Wang |
| 2017/0225573 A1 | 8/2017 | Waltner |
| 2017/0240291 A1 | 8/2017 | Kim |
| 2017/0331323 A1 | 11/2017 | Ehrmantraut |
| 2018/0002011 A1 | 1/2018 | Mccullough |
| 2018/0002012 A1 | 1/2018 | Mccullough |
| 2018/0029693 A1 | 2/2018 | Vander Lind |
| 2018/0076646 A1 | 3/2018 | Lindsay |
| 2018/0086447 A1 | 3/2018 | Winston |
| 2018/0265193 A1 | 9/2018 | Gibboney |
| 2019/0023203 A1 | 1/2019 | Lages |
| 2019/0071172 A1 | 3/2019 | Caldwell |
| 2019/0100322 A1 | 4/2019 | Schank |
| 2019/0112028 A1 | 4/2019 | Williams |
| 2019/0118943 A1 | 4/2019 | Machin |
| 2019/0135425 A1 | 5/2019 | Moore |
| 2019/0329863 A1 | 10/2019 | King |
| 2019/0352002 A1 | 11/2019 | Schulte |
| 2019/0375495 A1 | 12/2019 | Pfammatter |
| 2020/0130858 A1 | 4/2020 | Julien |
| 2020/0272141 A1 | 8/2020 | Chung |
| 2020/0274371 A1 | 8/2020 | Kirleis |
| 2020/0381927 A1 | 12/2020 | Feng |
| 2020/0406705 A1 | 12/2020 | Vila Soler |
| 2021/0309207 A1 | 10/2021 | Frederiksen |
| 2022/0029431 A1 | 1/2022 | Mclean |

FOREIGN PATENT DOCUMENTS

| | | | |
|---|---|---|---|
| CN | 101320821 | 7/2010 |
| CN | 104853949 A | 8/2015 |
| CN | 105981258 A | 9/2016 |
| CN | 106170902 | 8/2018 |
| CN | 111614133 | 9/2020 |
| CN | 113682479 | 11/2021 |
| CN | 215753045 | 2/2022 |
| GB | 2592245 A * | 8/2021 | ............ B60L 58/18 |
| JP | H11332023 | 11/1999 |
| JP | 2004111242 | 4/2004 |
| JP | 2006121874 | 5/2006 |
| JP | 2008260346 | 10/2008 |
| JP | 2015050041 | 3/2015 |
| JP | 2022063228 | 4/2022 |
| KR | 20160051690 | 5/2016 |
| NO | 2017113338 | 7/2017 |
| WO | 2013090080 | 6/2013 |
| WO | 2014199942 | 12/2014 |
| WO | 2015137222 | 9/2015 |

OTHER PUBLICATIONS

International Application No. PCT/US17/34950 International Search Report and Written Opinion, Mailed Aug. 17, 2017.

Mark Moore, Vehicle Collaboration Strategy and Common Reference Models, Uber Elevate Transformative VTOL Workshop, Jan. 2018.

* cited by examiner

BATTERY SYSTEMS WITH POWER OPTIMIZED ENERGY SOURCE AND ENERGY STORAGE OPTIMIZED SOURCE

CROSS REFERENCE TO OTHER APPLICATIONS

This application is a continuation of U.S. patent application Ser. No. 17/824,633 entitled BATTERY SYSTEMS WITH POWER OPTIMIZED ENERGY SOURCE AND ENERGY STORAGE OPTIMIZED SOURCE filed May 25, 2022 which is incorporated herein by reference for all purposes.

BACKGROUND OF THE INVENTION

Electric vertical takeoff and landing (eVTOL) aircraft are battery powered and take off and land vertically. The electric nature of eVTOL aircraft is attractive because such aircraft do not emit carbon dioxide. The vertical takeoff and landing capability of eVTOL aircraft enables a smaller footprint, permitting them to be used away from runways and/or in a more urban setting. Although battery systems for eVTOL aircraft exist, further improvements to such battery systems would be desirable. For example, new battery systems which improve performance over existing battery systems (e.g., increasing the vehicle range to battery weight ratio) and/or that are designed with an eye to maintenance considerations over the battery system's lifetime would be desirable.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Various embodiments of a battery system with a power optimized energy source and an energy storage optimized source are described herein. In examples described herein, the power optimized energy source and energy storage optimized source are connected in parallel; a parallel connection may be helpful in mitigating heat. In some embodiments, the battery system is used to power an electric vertical takeoff and landing (eVTOL) aircraft. For example, during the high power vertical takeoff, the power optimized energy source may provide most (or all) of the power. During the eVTOL aircraft's cruise mode, the energy storage optimized source may provide most (or all) of the power.

Figure 1:
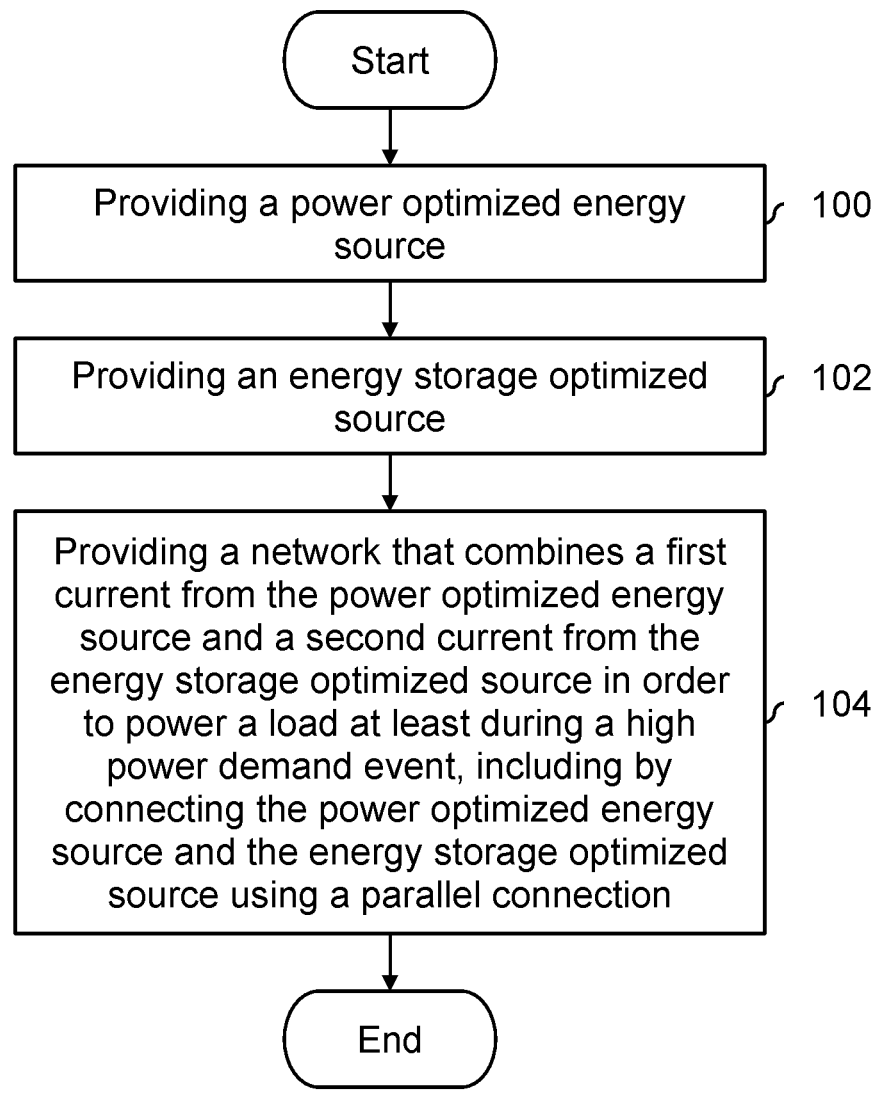
FIG. 1 is a flowchart illustrating an embodiment of a process to provide a battery system with a power optimized energy source and an energy storage optimized source.

FIG. 1 is a flowchart illustrating an embodiment of a process to provide a battery system with a power optimized energy source and an energy storage optimized source. In some embodiments, the process is performed by a battery system that is used to power an (electric) aircraft with at least two modes of flight (e.g., hover mode and a cruise mode).

At 100, a power optimized energy source is provided. For example, lithium ferrophosphate (LFP) and lithium titanium oxide (LTO) have good power performance and may be provided (e.g., included in the battery system) as the power optimized energy source. Exemplary ranges and/or quantified characteristics which more clearly define a power optimized energy source are described in more detail below.

At 102, an energy storage optimized source is provided. For example, lithium nickel manganese cobalt oxide (NMC), lithium nickel cobalt aluminum oxide (NCA), lithium cobalt oxide (LCO), and hydrogen fuel cells have good energy storage density and may be provided (e.g., included in the battery system) as the energy storage optimized source. Exemplary ranges and/or quantified characteristics which more clearly define an energy storage optimized source are described in more detail below.

At 104, a network that combines a first current from the power optimized energy source and a second current from the energy storage optimized source in order to power a load at least during a high power demand event is provided, including by connecting the power optimized energy source and the energy storage optimized source using a parallel connection. For example, depending upon the application and/or design parameters, some types of (e.g., electrical) networks may be preferred over other types of networks. Some embodiments of (electrical) networks are described in more detail below.

In some embodiments, the network (e.g., provided at step 104 in FIG. 1) also combines currents from the power optimized energy source and the energy storage optimized source during other events and/or times. In one example, the high power demand event is associated with a vertical takeoff (or landing) performed by an eVTOL aircraft during a hovering mode. In some embodiments, the network also combines current from the two sources during some other (flight) mode, such as a cruise mode.

Combining the currents from the two sources at least during a high power demand event (e.g., at step 104 in FIG. 1) may be particularly attractive for aircraft applications. For example, if one of the sources unexpectedly goes out during the high power demand event (e.g., a vertical takeoff or landing), current from the other source is still available and provided to the load. Even if the remaining source is the energy storage optimized source (which is not necessarily optimal for the high power demand event), something is better than nothing to keep the aircraft airborne.

Another benefit of combining currents (e.g., as opposed to switching between the currents) in a high power demand event is that the electronics and/or circuitry associated with combining currents may be less complex than that associated with switching. For example, in aircraft applications, a less complex battery system design may be desirable because of stringent safety and/or certification requirements (i.e., electronics and/or circuits that combine currents may be safer and/or easier to certify than those that switch between currents).

In some embodiments, the currents are not combined during some time outside of the high power demand event. In one example described in more detail below, a DC-to-DC converter sits between an energy storage optimized source and a power optimized energy source and charges the latter from the former after a high power demand event has ended.

It may be helpful to describe an example of a load (e.g., that is powered by the process of FIG. 1) and a high power demand event in order to better understand the technique. The following figure describes an example of an aircraft that includes a battery system embodiment according to the techniques described herein.

Figure 2:
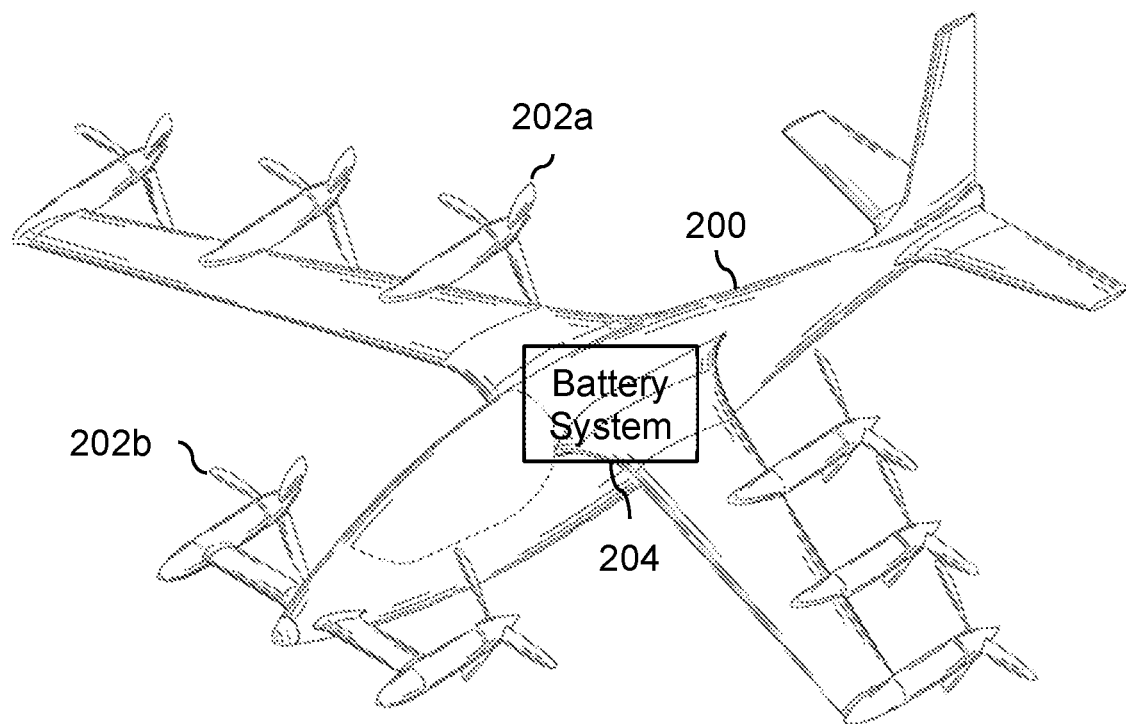
FIG. 2 is a diagram illustrating an embodiment of a multimode aircraft that is also an eVTOL aircraft.

FIG. 2 is a diagram illustrating an embodiment of a multimode aircraft that is also an eVTOL aircraft. In this example, the aircraft (200) includes a battery system (204) and in some embodiments that battery system performs the process of FIG. 1. For example, the main wing tiltrotors (202a) and canard tiltrotors (202b) as well as avionics electronics (not shown) may be powered by the included battery system. The battery system (204) is one example of a system that performs the process of FIG. 1. It is noted that although the example shown here is an eVTOL aircraft, the battery techniques described herein are applicable to and may be used by conventional takeoff and landing (CTOL) electric aircraft.

In this example, the aircraft (200) is an eVTOL aircraft that is also a multimode aircraft that is capable of flying in multiple modes or configurations. In the state or configuration shown here, the tiltrotors (202a and 202b) are shown in a cruise mode or position (sometimes referred to as forward flight mode or position). The tiltrotors (202a and 202b) are also capable of rotating into hover mode or position (with the tiltrotors in a downward position, not shown here), for example, when taking off or landing vertically, or to hover in a fixed position in the air.

One attractive feature of the exemplary vehicle shown is that it is not tied to a runway for takeoffs and landings. Potentially, such a vehicle could be used as an electric car in densely crowded and/or urban environments, for example, taking off from and landing on rooftops and/or parking lots and moving people from one point in a traffic-congested city to another point in the city. In various embodiments, the aircraft may be an autonomous aircraft or a piloted aircraft.

In this example, the aircraft (200) is a 400 kg, single-occupant vehicle. To take off vertically with the tiltrotors (202a and 202b) in hover position (not shown here), the exemplary aircraft (200) requires 100 kW of power from the battery system (204). In one example flight, once the aircraft has ascended to a desired and/or predefined cruising height (e.g., above any buildings, power lines, trees, and/or other obstacles along the planned flight path), the aircraft transitions from hover mode to cruise mode, including by rotating the tiltrotors (202a and 202b). When the aircraft (200) is in cruise mode (e.g., including by rotating the tiltrotors (202a and 202b) into the position shown here), the power requirement reduces to $\frac{1}{5}^{th}$ or less of that (i.e., or less). To land, the tiltrotors (202a and 202b) rotate back into hover position and the power requirement correspondingly increases back to 100 kW.

To put it another way, during hover mode, a battery system that provides a lot of power is desired (e.g., note the much larger power requirement of 100 kW during hover mode compared to the lower power requirement of 20 kW or less during cruise mode). During cruise mode, a battery system with good energy storage is desired (e.g., to maximize the range of the aircraft in this flight mode).

Earlier versions of battery systems that were used in the exemplary eVTOL aircraft used a single type of battery chemistry (e.g., a single class or type of lithium ion). The use of a single battery chemistry simplified the design and was an important consideration given the relatively early stages of battery development and/or prototyping. However, power and energy (storage) tend to be inversely proportional to each other. To put it another way, a battery chemistry that has good power performance will tend to have poor energy storage performance and vice versa. As a result, the earlier battery systems used a single battery chemistry where the battery chemistry was selected to have a compromised energy and power performance level (e.g., between an optimal cruise level and optimal hover level), providing both flight modes with less than optimal battery performance.

To satisfy the different desired performance characteristics of the exemplary eVTOL aircraft in both cruise mode and hover mode, various embodiments of a battery system with both a power optimized energy source and an energy storage optimized source are described herein. By including both a power optimized energy source and an energy storage optimized source in the battery systems described herein, the range of the vehicle can be extended. In particular, because the power differences between hover mode (100 kW) and cruise mode (20 kW or less) for the exemplary eVTOL aircraft (200) are relatively large (e.g., 80 kW or more), the sub-optimal performance of a single, compromised battery chemistry is more noticeable.

In contrast, for an electric car, the power requirements are different and therefore battery systems designed for electric cars are not suitable for eVTOL aircraft. For example, an electric car at high acceleration takes ~3 seconds to go from 0-60 mph or ~10 seconds to go a quarter of a mile (which for comparison purposes is compared against an eVTOL aircraft's vertical takeoff). The duration of this high power event for an electric car is much shorter than for the exemplary eVTOL aircraft (e.g., which could take a minute or longer to reach a desired or cruising altitude). Likewise, the amount of power required is much lower for an electric car than for the exemplary eVTOL aircraft. As such, batteries that are designed for electric cars are insufficient for the eVTOL aircraft due to both duration and amount of power required.

In terms of c rate (e.g., associated with the magnitude of the discharge and/or charge current as compared to its capacity), the exemplary eVTOL aircraft (200) may require a c rate of 12c during hover mode and a c rate of 1c during cruise mode. In contrast, an electric car may require a c rate of 6c during acceleration and a c rate of 0.5c during cruising.

The following table illustrates some examples of battery (chemistry) types which may be used as the power optimized energy source or the energy storage optimized source.

TABLE 1

Example battery chemistry types for power optimized energy source and energy storage optimized source.

| Battery (Chemistry) Type | V_min | V_nom | V_max | Energy Density (kW/kg) | Example of |
|---|---|---|---|---|---|
| Lithium Nickel Manganese Cobalt Oxide (NMC)/ Lithium Nickel Cobalt Aluminum Oxides (NCA) | 2.5 V | 3.6 V | 4.2 V | Good (250-320 Wh/kg) | Energy Storage Optimized Source |
| Lithium Ferro-phosphate (LFP) | 2.0 V | 3.2 V | 3.6 V | Worse (90-160 Wh/kg) | Power Optimized Energy Source |
| Lithium Cobalt Oxide (LCO) | 3.0 V | 3.8 V | 4.4 V | Good (150-200 Wh/kg) | Energy Storage Optimized Source |
| Lithium Titanium Oxide (LTO) | 1.5 V | 2.4 V | 3.0 V | Worst (60-100 Wh/kg) | Power Optimized Energy Source |
| Super capacitor | 2.3 V | 2.5 V | 2.75 V | Worst (30-50 Wh/kg) | Power Optimized Energy Source |

As shown in the above table, in some embodiments, the power optimized energy source (e.g., in step 100 in FIG. 1) has an energy density within a range of 50-200 Wh/kg at a system level (e.g., where the frame of reference for the energy density is at the (e.g., battery) system as a whole and/or takes into account all of the power optimized energy sources in the system). In some embodiments, the energy storage optimized source (e.g., in step 102 in FIG. 1) has an energy density within a range of 150-500 Wh/kg at a system level.

As shown in the example of FIG. 2, in some embodiments, the load (e.g., in step 104 of FIG. 1) is associated with an aircraft and the high power demand event (e.g., in step 104 of FIG. 1) is associated with a vertical takeoff and landing performed by the aircraft. In some embodiments, the aircraft is a multimode aircraft that has at least two flight modes, including: (1) a hovering flight mode during which the vertical takeoff and landing is performed by the multimode aircraft and (2) a cruise mode. For example, the multimode aircraft may include tiltrotors and during the hovering flight mode the tiltrotors are tilted downward (e.g., for vertical thrust) and during cruise mode the tiltrotors are tilted aftward (e.g., for horizontal thrust for wing-borne flight).

Depending upon the particular application and/or selected battery (chemistry) types, some types of network embodiments may be more attractive than others. The following figures describe various embodiments of (electrical) networks that are used to connect the power optimized energy source and energy storage optimized source (e.g., including by combining current from the two sources).

Figure 3:
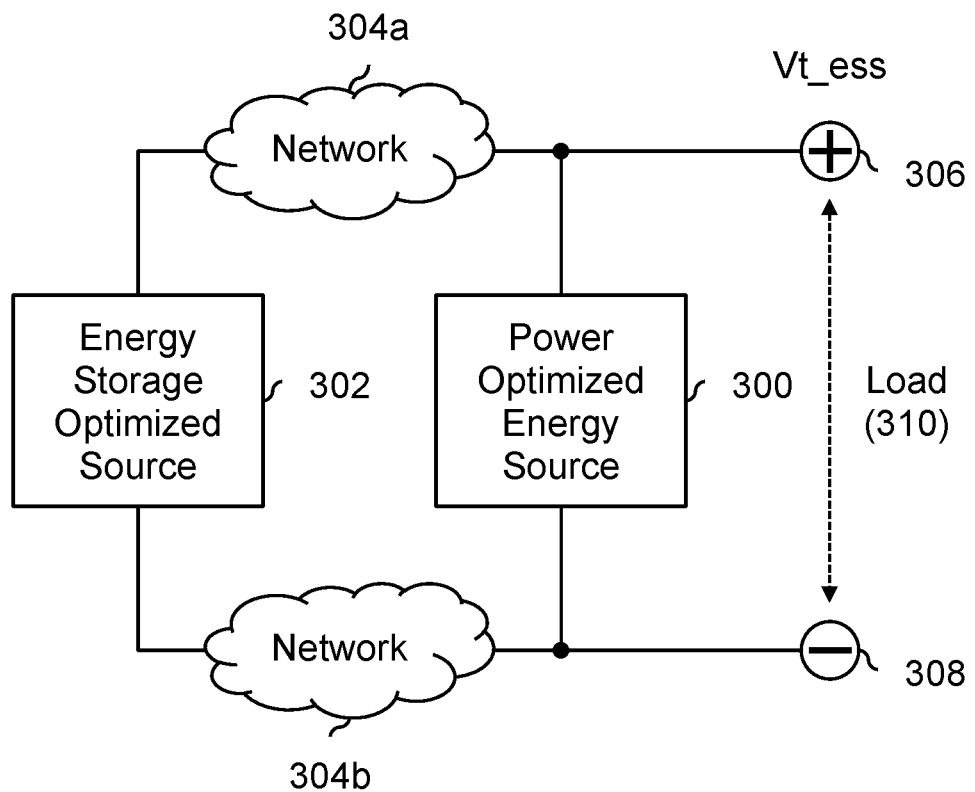
FIG. 3 is a diagram illustrating an embodiment of a battery system with a power optimized energy source and an energy storage optimized source.

FIG. 3 is a diagram illustrating an embodiment of a battery system with a power optimized energy source and an energy storage optimized source. In this example, the power optimized energy source (300) and the energy storage optimized source (302) are (electrically) connected in a parallel configuration using a positive terminal network (304a) and a negative terminal network (304b). The positive terminal network (304a) is in turn coupled to a positive (output) terminal (306) and the negative terminal network (304b) is in turn coupled to a negative (output) terminal (308).

For simplicity and ease of explanation, the voltage of the negative terminal (308) is assumed to be at zero (0) volts and the voltage of the positive terminal (306) is Vt_ess. A load (310) is powered by connecting the load to the positive terminal (306) and negative terminal (308).

For simplicity and ease of explanation, in this example, a single power optimized energy source (300) and a single energy storage optimized source (302) are shown here but in some other embodiments there are multiple instances of one or both battery chemistry types. In one straightforward example, a 100s1p (i.e., 100 series, 1 parallel) set of power optimized energy sources (300), such as cells, is directly in parallel with a 100s4p (i.e., 100 series, 4 parallel) set of energy storage optimized sources (302), such as cells, on a common bus. Tying everything together on a common bus forces the voltages to be at the same voltage; any impedance difference would be resolved by having the currents through each source (e.g., each cell).

A benefit of the parallel configuration shown here is heat mitigation. For example, an energy storage optimized source (302) for the eVTOL application described herein may have an internal resistance in the range of 0.8-1.5 Ohm. In contrast, the internal resistance for a power optimized energy source (300) would be in the range of 0.2-0.5 Ohm. If the power optimized energy source (300) and the energy storage optimized source (302) were put in series with each other (not shown here), the current from the source with the lower internal resistance (i.e., the power optimized energy source) would be forced to pass through the source with the higher internal resistance (i.e., the energy storage optimized source), thus generating (more) heat. In particular, for eVTOL aircraft applications (with relatively large differences in internal resistance between battery (chemistry) types that meet the requirements of hover mode versus cruise mode) means that a significant amount of heat could be generated by an in-series connection, as opposed to battery (chemistry) types designed for electric car applications which may have more similar internal resistances and thus heat generation may be less of a concern. With the parallel configuration shown here, this additional heat generation can be avoided.

Likewise, different battery chemistries sometimes have different voltages (see, e.g., Table 1). If two different battery chemistries were connected in series with each other, an imbalance of voltages could prevent that entire series connection (e.g., a string) from being usable. In contrast, a parallel connection is better able to adapt to a voltage difference or imbalance because the currents through different sources would adjust as or if needed.

For these reasons, in this example and others described herein, different battery chemistries are connected (e.g., via an electrical network) in parallel configurations as opposed to in series with each other. To put it another way, in examples described herein, a power optimized energy source (e.g., a cell or other unit) and an energy storage optimized source (e.g., a cell or other unit) are not connected (e.g., entirely) in series with each other which would force the current from the source with the lower internal resistance through the source with the (substantially) higher internal resistance, generating (more) heat.

The following figures describe various embodiments of (electrical) networks (e.g., 304a and 304b) that may be used to (electrically) connect one or more energy storage optimized sources (302) and one or more power optimized energy sources (300).

Figure 4:
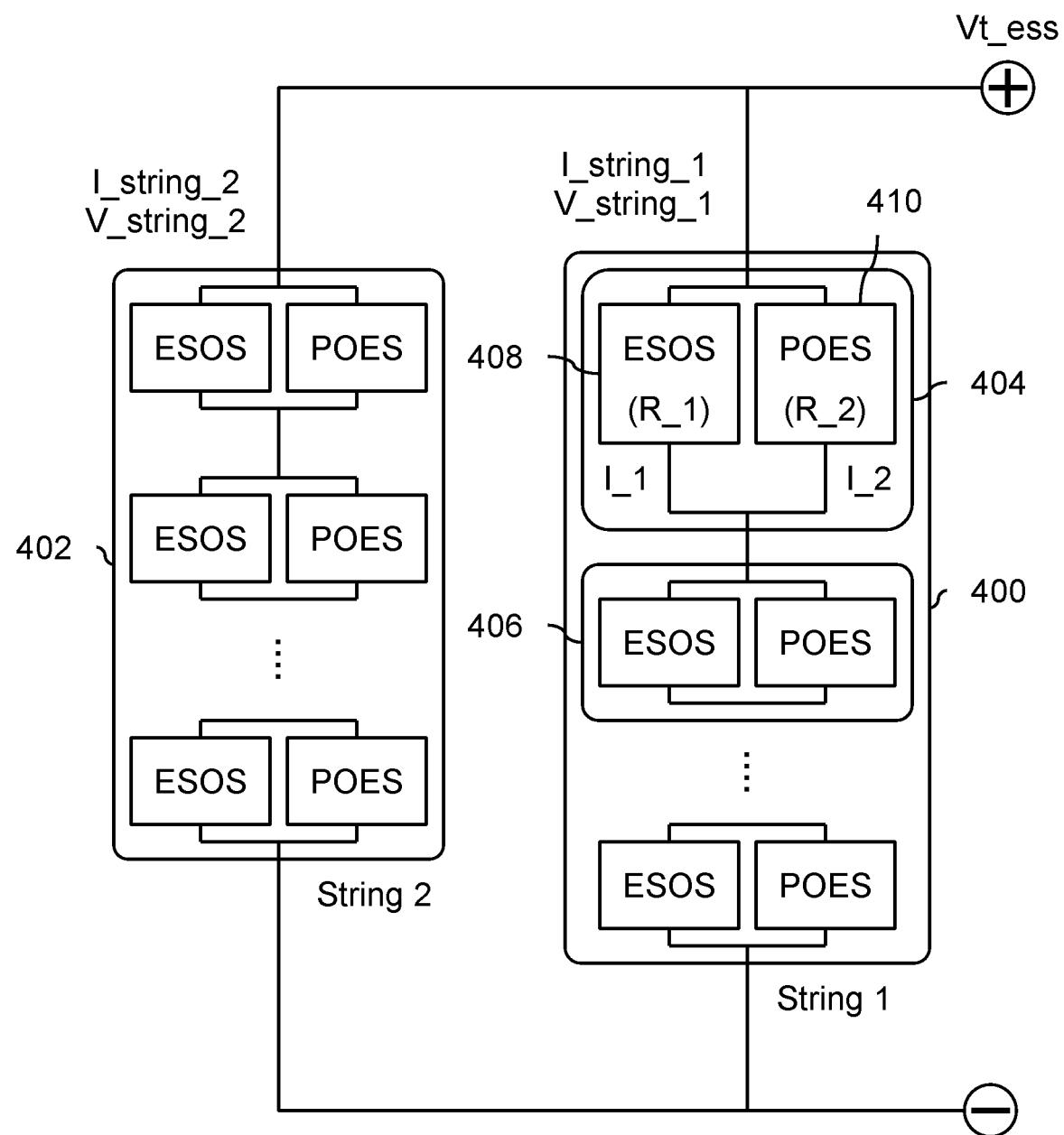
FIG. 4 is a diagram illustrating an embodiment of a battery system with multi-source sub-packs.

FIG. 4 is a diagram illustrating an embodiment of a battery system with multi-source sub-packs. As used herein, a multi-source sub-pack refers to a sub-pack (e.g., 404) that includes multiple sources (i.e., at least one energy storage optimized source (e.g., 408) and at least one power optimized energy source (410)). In this example, two strings (400 and 402) are in a parallel configuration with each other; in some embodiments there may be additional strings in this parallel connection.

Each of the strings (400 and 402) in this example includes a plurality of multi-source sub-packs (e.g., 404, 406, etc.) where the sub-packs in a string are connected in series with each other. For example, in string 1 (400), the topmost sub-pack (404) is connected in series to a second sub-pack (406) and so on. Within each multi-source sub-pack (see, e.g., 404), there is at least one energy storage optimized source (e.g., 408) and at least one power optimized energy source (e.g., 410) that are connected in parallel with each other within the sub-pack.

The currents through string 1 (400) and string 2 (402) are I_string_1 and I_string_2, respectively, and the voltages across the strings are V_string_1 and V_string_2, respectively.

The output voltage (Vt_ess) of the example system shown here is Vt_ess=N_s*(OCVb−(I_string_1*Rb_1)) where N_s is the number of sub-packs (e.g., sub-pack 404 and 406) per string, OCVb is the open circuit voltage across one sub-pack, I_string_1 is the current through one of the strings, and Rb_1 is the internal resistance of one of the sub-packs. Due to the parallel configuration within each sub-pack in this example, Rb_1=(R_1*R_2)/(R_1+R_2) where R_1 is (for example) the internal resistance of an energy storage optimized source (e.g., 408) in a sub-pack (e.g., 404) and R_2 is the internal resistance of a power optimized energy source (e.g., 410) in a sub-pack (e.g., 404).

Within a sub-pack (e.g., 404), the current though each source (e.g., I_1 through energy storage optimized source (408) and I_2 through power optimized energy source (410)) sums to be the current through that string. For example, I_1+I_2=I_string_1. The ratio of the currents (e.g., I_1 and I_2) through the sources (e.g., 408 and 410) is determined by the internal resistances through the sources (e.g., I_1: I_2=R_2:R_1) such that the source with the lower internal resistance has more of that string's current pass through it. For example, in the first string: I_1=I_string_1*(R_2/(R 1+R_2)) and I_2=I_string_1*(R_1/(R 1+R_2)).

In some embodiments, each battery sub-pack (e.g., 404, 406, etc.) is enclosed in a case or shell so that (e.g., selected or individual) battery sub-packs can be replaced within a string once a battery sub-pack has worn out. In some embodiments, each battery sub-pack includes monitoring equipment and/or logic (e.g., sometimes referred to as a battery management system) to monitor the state of that battery sub-pack (e.g., a state of health, lifetime, and/or wear metric) so that battery sub-packs can be replaced as or if needed. This information may be displayed on the exterior of the battery sub-pack and/or reported to some central monitoring device (e.g., through the battery system and up to a controller in an eVTOL aircraft for display in a cockpit display).

A benefit to the example battery system shown here is that it simplifies manufacturing and/or maintenance of the battery system. With this configuration, only a single type of battery sub-pack is manufactured and supported (i.e., all of the battery sub-packs are identical, regardless of which string they are in). If a battery sub-pack wears out and needs to be replaced, replacement of the battery sub-packs is simplified for a technician and a service facility only needs to keep one type of battery sub-pack on hand.

As is shown in this example, in some embodiments, the network (e.g., at step 104 in FIG. 1) includes a plurality of strings in parallel; at least one string in the plurality of strings includes a plurality of multi-source sub-packs in series; and at least one multi-source sub-pack in the plurality of multi-source sub-packs includes the power optimized energy source and the energy storage optimized source in parallel.

In a more specific example of how FIG. 4 may be implemented, the load may be associated with a multimode aircraft where the high power demand event is associated with a vertical takeoff and landing performed by the multimode aircraft. The power optimized energy source may be an LFP battery (e.g., with a c rate on the order of 12c) and the energy storage optimized source may be a solid state battery (e.g., with a c rate on the order of c rate of 1c). In this example, there is between 1-600 energy storage optimized sources (e.g., 408) per multi-source sub-pack (e.g., 404 or 406) where each energy storage optimized sources (e.g., 408) has a 5 A-h capacity per unit; there are between 1-600 power optimized energy sources (e.g., 410) per multi-source sub-pack (e.g., 404 or 406) where each power optimized energy source (e.g., 410) has a 5 A-h capacity per unit. Lastly, there are between 1-8 strings in the battery system (at least in this example).

As described above, depending upon the application, different (electrical) networks within the battery system may be more attractive than others. The following figure describes an alternate embodiment.

Figure 5:
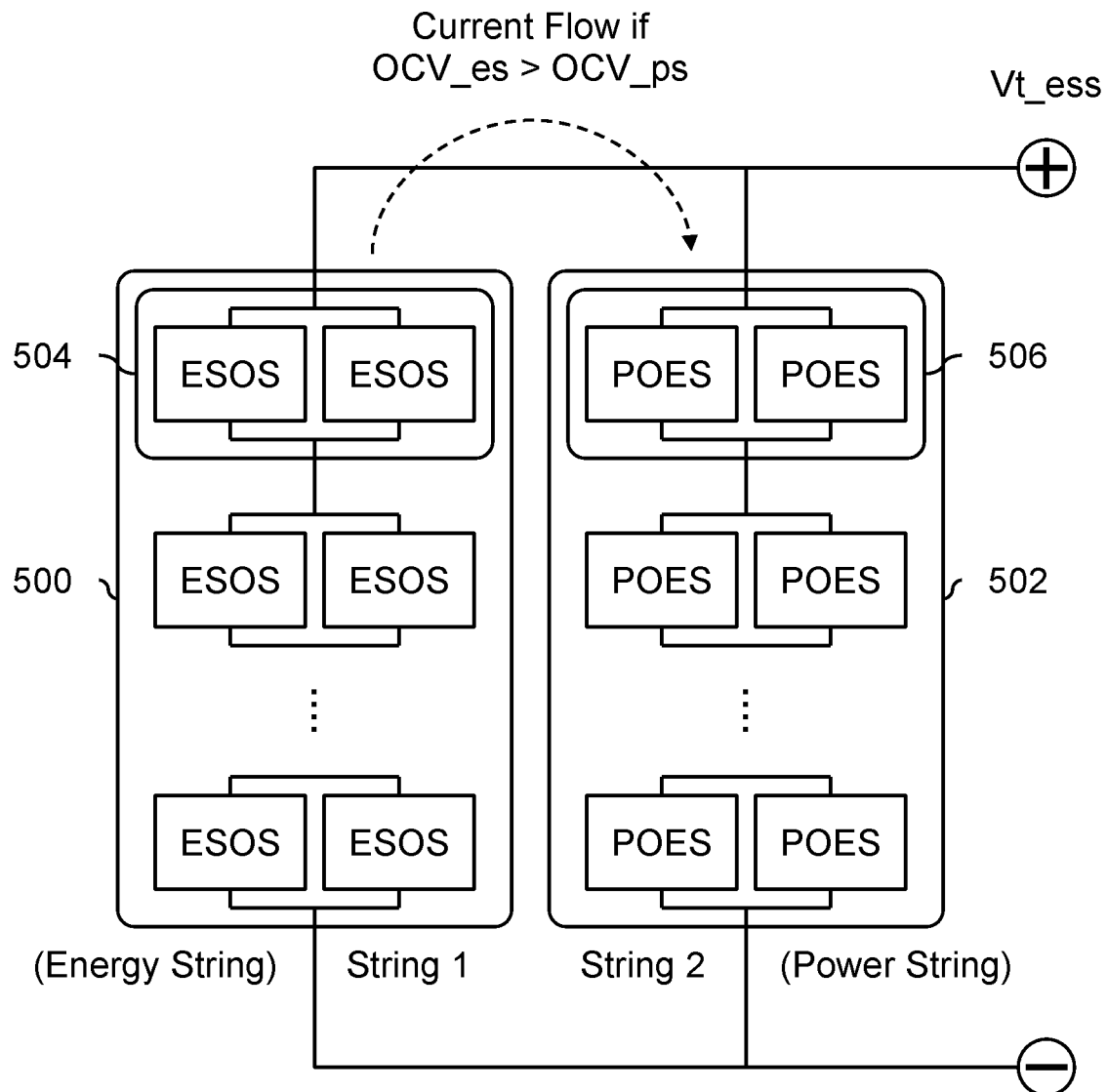
FIG. 5 is a diagram illustrating an embodiment of a battery system with single-source sub-packs.

FIG. 5 is a diagram illustrating an embodiment of a battery system with single-source sub-packs. For brevity and to eliminate redundancy, some features and/or characteristics which are the same or similar to above examples are not described for this configuration.

In this example there are two strings: a first string (500) associated with energy storage optimized sources and a second string (502) associated with power optimized energy sources. Both strings (500 and 502) have a plurality of single-source sub-packs connected in series, but each sub-pack has a different (but single) battery chemistry and/or type. The sub-packs (e.g., 504) in the first string (500) include a plurality of energy storage optimized sources in parallel; the sub-packs (e.g., 506) in the second string (502) include a plurality of power optimized energy sources in parallel. For convenience, the first string (500) is sometimes referred to as the energy string and sub-packs therein are sometimes referred to as energy sub-packs (e.g., 504). Similarly, the second string (502) is sometimes referred to as the power string and sub-packs therein are sometimes referred to as power sub-packs (e.g., 506).

As shown in this example, in some embodiments, there is a plurality of power optimized energy sources and a plurality of energy storage optimized sources; the network includes at least a first string and a second string in parallel; the first string includes a first plurality of single-source sub-packs in series; at least one single-source sub-pack in the first plurality of single-source sub-packs includes the plurality of energy storage optimized sources in parallel; the second string includes a second plurality of single-source sub-packs in series; and at least one single-source sub-pack in the second plurality of single-source sub-packs includes the plurality of power optimized energy sources in parallel.

In a more specific example of how FIG. 5 may be implemented, the load is associated with a multimode aircraft where the high power demand event is associated with a vertical takeoff and landing performed by the multimode aircraft. In this example, there are between 1-1200 power optimized energy sources that are LFP batteries per power sub-pack (e.g., 506) where each unit has a 5 A-h capacity); there are between 1-1200 energy storage optimized sources that are solid state batteries per energy storage sub-pack (e.g., 504) where each unit has a 5 A-h capacity. There are between 14-600 power sub-packs (e.g., 506) per power string (e.g., 502) and between 14-400 energy sub-packs (e.g., 504) per energy string (e.g., 500). At the top level, there are between 1-8 power strings (e.g., 502) and 1-8 energy strings (e.g., 500).

A benefit to the example configuration shown here is that it may be desirable for maintenance (e.g., because it is less wasteful and/or permits more of a source's lifetime to be utilized). For example, the power sub-packs (e.g., 506) will tend to age faster than energy sub-packs (504) because battery chemistries and/or types that are used for the power optimized energy sources tend to age faster than those for energy storage optimized sources. With the homogeneous configuration shown here, a sub-pack (e.g., 504 or 506) can be replaced without unnecessarily swapping out an energy storage optimized source that still has some useable lifetime (i.e., has not yet worn out). This may be less wasteful and/or less expensive and therefore desirable in at least some applications.

Another benefit to the example shown here is that different operating conditions can (more easily) be maintained for the different strings, if desired. For example, the energy string (500) and power string (502) may have different ranges of (e.g., preferred) operating temperatures or, more generally, different heating and/or cooling requirements (e.g., due to their different chemistries, the different amounts of heat they generate, etc.). In some embodiments, each string has its own independent temperature control system so that the two strings can be heated or cooled independently of each other so that both are operating at a temperature that is optimal for that battery chemistry and/or type. In contrast, with a sub-pack with a mix of sources, it may be more difficult to independently heat or cool the different battery chemistries and/or types.

It may be helpful to walk through an example where the battery is used to power an eVTOL aircraft to better appreciate certain aspects of the example configuration shown. Initially, the energy string (500) and the power string (502) both have states of charge (SOC) at 100% and both the energy sub-pack (504) and power sub-pack (506) have (nominal) voltages of 4.2 V. As will be described in more detail below, the voltages of the two sub-packs are matched to prevent an (open circuit) voltage imbalance between the two strings which would result in current flowing from one string to the other string. The open circuit voltage refers to the voltage (e.g., of a string) that would be observed if that string were in an open circuit state and/or not connected to the other elements.

The internal resistance of an energy sub-pack (e.g., 504) is denoted as $R\_ep$ and the internal resistance of a power sub-pack (e.g., 506) is $R\_pp$. In this example, the internal resistances of the respective sub-packs have a ratio of $R\_ep:R\_pp=2:1$ and the current from the respective strings (e.g., initially, before the vertical takeoff) is $I\_es=1$ A and $I\_ps=2$ A where $I\_es$ is the current from the energy string (500) and $I\_ps$ is the current from the power string (502).

During the vertical takeoff, the majority of the power is supplied by the power string (502). Suppose the eVTOL aircraft switches from hovering mode to cruise mode at time $T\_2$ (to put it another way, the vertical takeoff ends at time $T\_2$). At time $T\_2$, the energy string (500) will have a higher state of charge compared to the power string (i.e., $SOC\_es>SOC\_ps$) and likewise it will have a larger open circuit voltage (i.e., $OCV\_es>OCV\_ps$). Generally speaking, the state of charge will be a function of time and how much current is output by that string (i.e., $SOC\_i=function(t, I\_string\_i)$) and the open circuit voltage of a given string is a function of the state of charge (i.e., $OCV\_i=function(SOC\_i)$).

As a result of the imbalanced open circuit voltages after takeoff, current will flow across the strings (which in this example are connected together in parallel) in a manner that will attempt to equalize the voltages. More specifically, because $OCV\_es>OCV\_ps$, current will flow from the energy string (500) across the common bus to the power string (502).

In some applications, it may be desirable to stop the current flow from the energy string (500) to the power string (502) when there is an open circuit voltage imbalance. The following figure shows an example of this.

Figure 6:
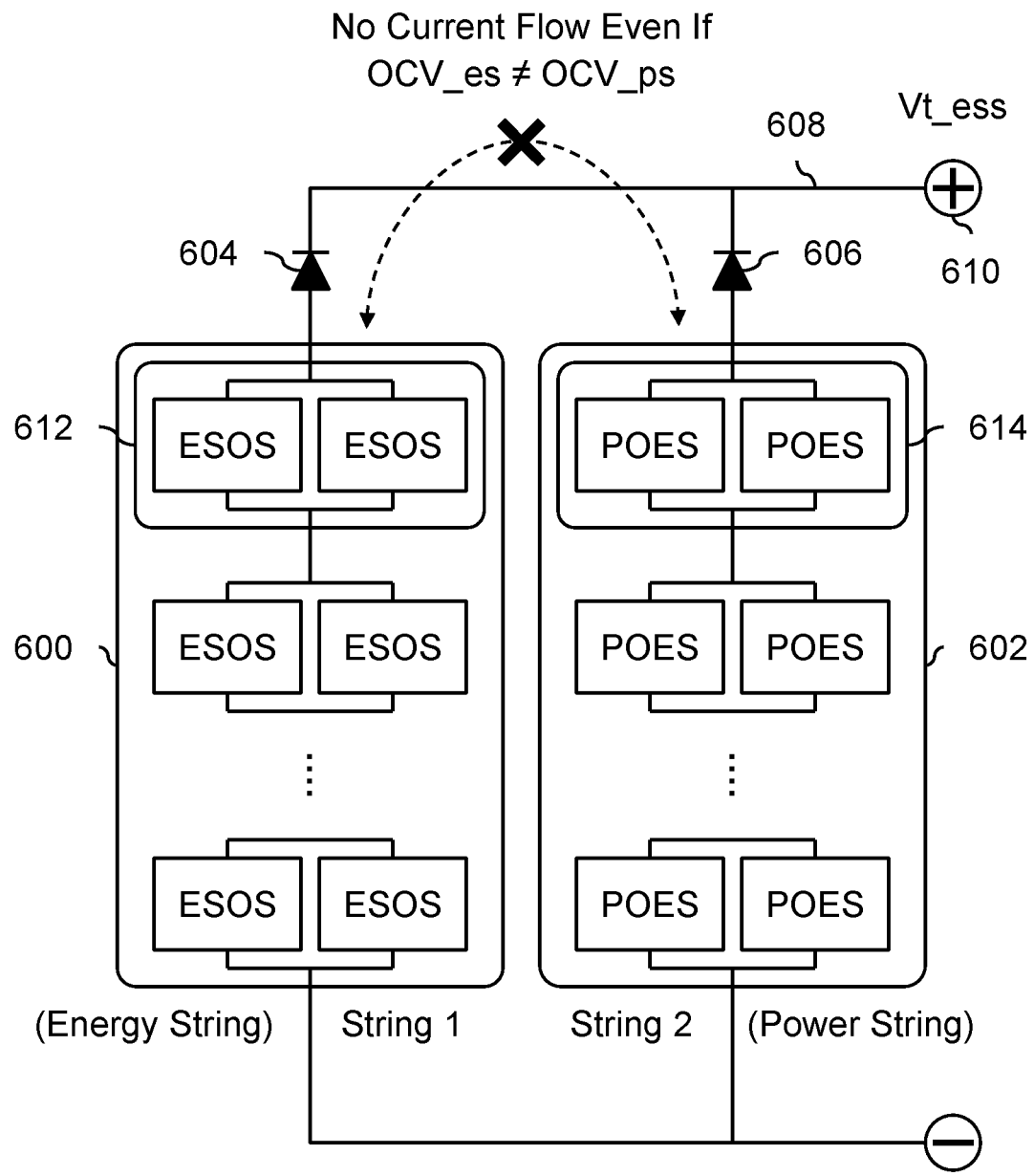
FIG. 6 is a diagram illustrating an embodiment of a battery system with single-source sub-packs and diodes.

FIG. 6 is a diagram illustrating an embodiment of a battery system with single-source sub-packs and diodes. For brevity and to eliminate redundancy, some features and/or characteristics which are the same or similar to above examples are not described for this configuration. The configuration of FIG. 6 is similar to that of FIG. 5 with diodes (604 and 606) added between the energy string (600) and power string (602), respectively, and the common bus (608). The diodes prevent current from flowing into the energy string (600) and power string (602) so that current can only flow out from the strings and towards the positive (output) terminal (610) to power the load (not shown). In some applications it may be desirable to prevent current from flowing from the energy string (600) to the power string (602) so that all (or at least more) of the power from the energy string (600) is used to power the load.

A benefit to the configuration with diodes shown here is that it permits a wider range of the battery (chemistry) types to be used (e.g., without having to match (nominal) voltages of the battery (chemistry) types). In one example, the diodes (604 and 606) permit the (nominal) voltage of an energy sub-pack (e.g., 612) to be within a range of 2.5V-4.2V and the (nominal) voltage of a power sub-pack (e.g., 614) to be within a range of 1.5V-3V. Even with different numbers of sub-packs per string, the (nominal) voltages of the two strings (600 and 602) may have some voltage difference or imbalance but the diodes prevent current from flowing from one string to the other. Expanding the range of (nominal) voltages which may be used together may be attractive because it expands the pool of battery (chemistry) types which may be used for the energy storage optimized source and/or the power optimized energy source.

As is shown in this example, in some embodiments with single-source sub-packs, the system further includes: (1) a first diode connected between the first string and a common bus and (2) a second diode connected between the second string and the common bus.

In some applications, it may be desirable to permit current to flow from the energy string (600) to the power string (602), but only if permitted. The following figure shows an example of this.

Figure 7:
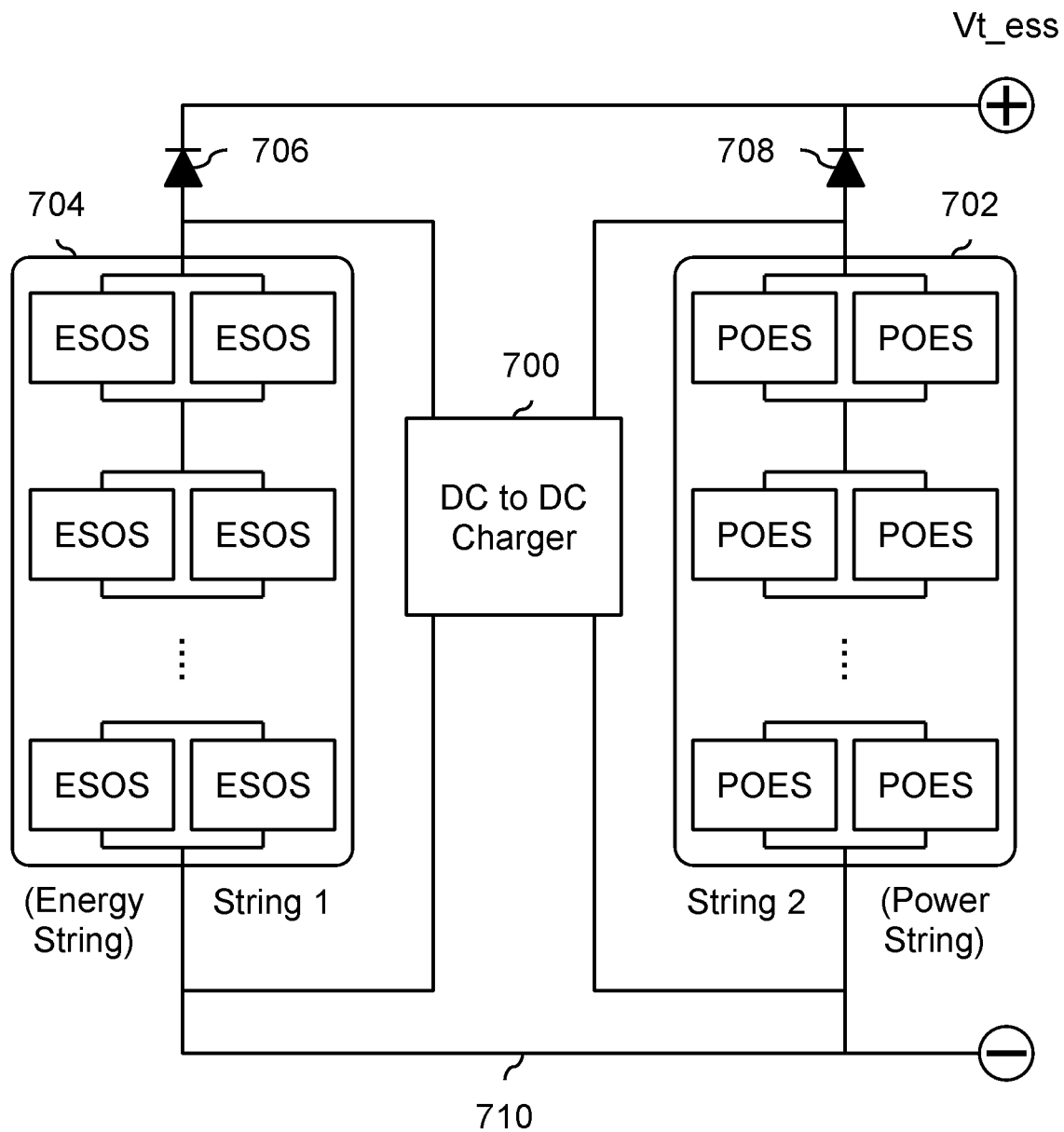
FIG. 7 is a diagram illustrating an embodiment of a battery system with a DC to DC charger.

FIG. 7 is a diagram illustrating an embodiment of a battery system with a DC to DC charger. For brevity, some features and/or characteristics which are the same or similar to above examples are not described. The example battery system shown here is similar to the example shown in FIG. 6, with the addition of a DC to DC charger (700).

On the energy string (704) side, the DC to DC charger (700) has a first (e.g., positive) connection between the first diode (706) and the energy string (704) and a second (e.g., negative) connection between the energy string (704) and a common ground (710) or common negative bus. Similarly, on the power string (702) side, there is a third (e.g., positive) connection between the second diode (708) and the power string (702) and a fourth (e.g., negative) connection between the power string (702) and the common ground (710).

In this example, a DC to DC charger (700) is used to charge the power string (702) off of the energy string (704). For example, after the exemplary battery system is used to perform a vertical takeoff, the power string (702) will be mostly drained. When the aircraft transitions from hover mode to cruise mode, the DC to DC charger charges the power string from the energy string (704).

The exemplary DC to DC charger allows controlled current amplitude to replenish the charge of the power string. A diode connection to the power string without the DC to DC charger would result in too much current, limited only by resistances. The amount of charging energy can be set by controls within the DC to DC charger so that the energy string primarily sources power to the vehicle.

In a more specific example, the DC to DC charger first checks if the voltage of the power string (702) is substantially lower than the voltage of the energy string (704) to determine if it should begin charging. If the DC to DC charger detects that the power string is more than 20% (as an example of some threshold) lower in voltage than the energy string, then charging begins. Otherwise, if ample power string voltage is detected (e.g., greater than 20% versus energy string), then charging will not begin because the DC to DC charger would be wasting energy. Once charging begins, the DC to DC charger will stop charging under normal conditions once the power string voltage is close to the energy string voltage (e.g., the voltages of the two stings are within some range). In some embodiments, the DC to DC charger stops charging the power string if the power string is supplying a large load (e.g., a supply metric (such as an amount of current, power, or energy) from the power string to the load exceeds some threshold).

In at least some applications, is not expected that the DC to DC charger will require galvanic isolation in representative systems. The size of the charger can be as large or as small as desired in a way that would optimize the target system behavior. As described herein, the DC to DC charger is expected to convert from an energy string with voltage higher than the voltage of a power string (buck conversion). If there are other systems where two types of batteries are shared in strings of unequal nominal voltage, a boost or a buck-boost converter may be used.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   a power optimized energy source;
   an energy storage optimized source;
   a DC to DC charger; and
   a network that combines a first current from the power optimized energy source and a second current from the energy storage optimized source in order to power a load at least during a high power demand event, including by connecting the power optimized energy source and the energy storage optimized source using a parallel connection, wherein:
   there is a plurality of power optimized energy sources and a plurality of energy storage optimized sources;
   the network includes at least a first string and a second string in parallel;
   the first string includes a first plurality of single-source sub-packs in series;
   at least one single-source sub-pack in the first plurality of single-source sub-packs includes the plurality of energy storage optimized sources in parallel;
   the second string includes a second plurality of single-source sub-packs in series;
   at least one single-source sub-pack in the second plurality of single-source sub-packs includes the plurality of power optimized energy sources in parallel; and
   the first string is an energy string having a first voltage and the second string is a power string having a second voltage.

2. The system recited in claim 1, wherein the power optimized energy source has an energy density within a range of 50-200 Wh/kg at a system level.

3. The system recited in claim 1, wherein the energy storage optimized source has an energy density within a range of 150-500 Wh/kg at a system level.

4. The system recited in claim 1, wherein:
   the load is associated with an aircraft; and
   the high power demand event is associated with a vertical takeoff and landing performed by the aircraft.

5. The system recited in claim 1, wherein:
   the load is associated with a multimode aircraft;
   the high power demand event is associated with a vertical takeoff and landing performed by the multimode aircraft; and
   the multimode aircraft has at least two flight modes, including: (1) a hovering flight mode during which the vertical takeoff and landing is performed by the multimode aircraft and (2) a cruise mode.

6. The system recited in claim 1, further including: (1) a first diode connected between the first string and a common bus and (2) a second diode connected between the second string and the common bus.

7. The system recited in claim 1, wherein:
   the DC to DC charger is configured to:
   determine whether the first voltage of the energy string exceeds the second voltage of the power string by a threshold; and
   in the event it is determined that the first voltage of the energy string exceeds the second voltage of the power string by the threshold, initiate charging of the power string from the energy string via the DC to DC charger.

8. The system recited in claim 1, wherein:
the DC to DC charger is configured to:
  determine whether a supply metric, associated with powering the load from the power string, exceeds a threshold; and
  in the event it is determined that the supply metric exceeds the threshold, stop charging of the power string from the energy string via the DC to DC charger.

9. A method, comprising:
providing a power optimized energy source;
providing an energy storage optimized source;
providing a DC to DC charger; and
providing a network that combines a first current from the power optimized energy source and a second current from the energy storage optimized source in order to power a load at least during a high power demand event, including by connecting the power optimized energy source and the energy storage optimized source using a parallel connection, wherein:
  there is a plurality of power optimized energy sources and a plurality of energy storage optimized sources;
  the network includes at least a first string and a second string in parallel;
  the first string includes a first plurality of single-source sub-packs in series;
  at least one single-source sub-pack in the first plurality of single-source sub-packs includes the plurality of energy storage optimized sources in parallel;
  the second string includes a second plurality of single-source sub-packs in series; and
  at least one single-source sub-pack in the second plurality of single-source sub-packs includes the plurality of power optimized energy sources in parallel.

10. The method recited in claim 9, wherein the power optimized energy source has an energy density within a range of 50-200 Wh/kg at a system level.

11. The method recited in claim 9, wherein the energy storage optimized source has an energy density within a range of 150-500 Wh/kg at a system level.

12. The method recited in claim 9, wherein:
the load is associated with an aircraft; and
the high power demand event is associated with a vertical takeoff and landing performed by the aircraft.

13. The method recited in claim 9, wherein:
the load is associated with a multimode aircraft;
the high power demand event is associated with a vertical takeoff and landing performed by the multimode aircraft; and
the multimode aircraft has at least two flight modes, including: (1) a hovering flight mode during which the vertical takeoff and landing is performed by the multimode aircraft and (2) a cruise mode.

14. The method recited in claim 9, further including:
providing (1) a first diode connected between the first string and a common bus and (2) a second diode connected between the second string and the common bus.

15. The method recited in claim 9, wherein:
the first string is an energy string having a first voltage and the second string is a power string having a second voltage; and
the DC to DC charger is configured to:
  determine whether the first voltage of the energy string exceeds the second voltage of the power string by a threshold; and
  in the event it is determined that the first voltage of the energy string exceeds the second voltage of the power string by the threshold, initiate charging of the power string from the energy string via the DC to DC charger.

16. The method recited in claim 9, wherein:
the first string is an energy string having a first voltage and the second string is a power string having a second voltage; and
the DC to DC charger is configured to:
  determine whether a supply metric, associated with powering the load from the power string, exceeds a threshold; and
  in the event it is determined that the supply metric exceeds the threshold, stop charging of the power string from the energy string via the DC to DC charger.

* * * * *